M. S. BRINGIER.
Evaporating Pan.
No. 94,942. Patented Sept. 21, 1869.
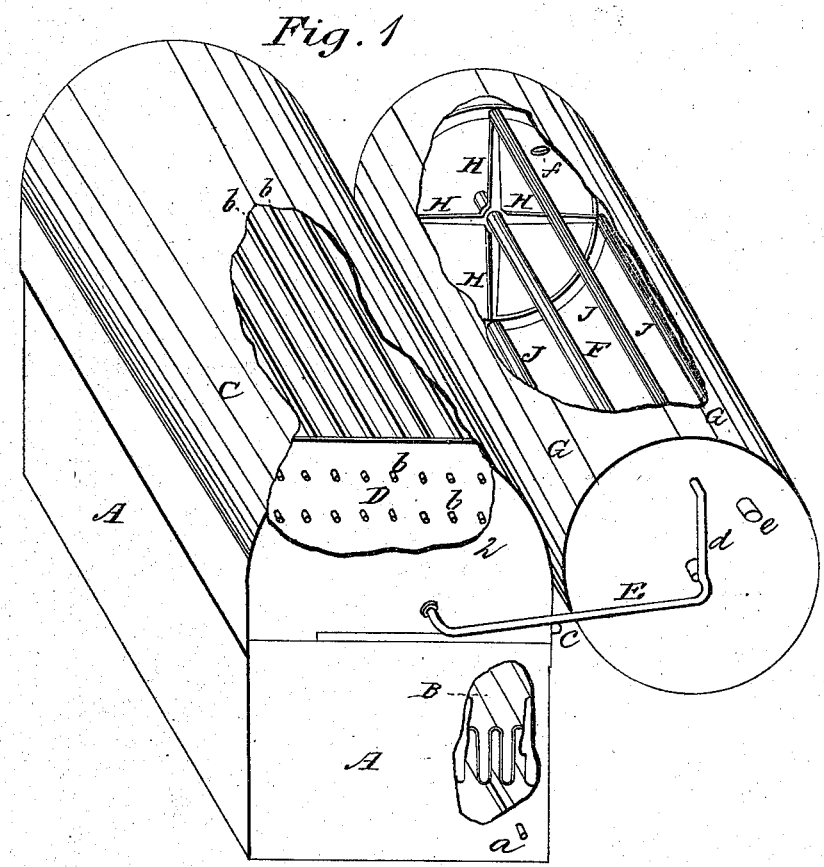
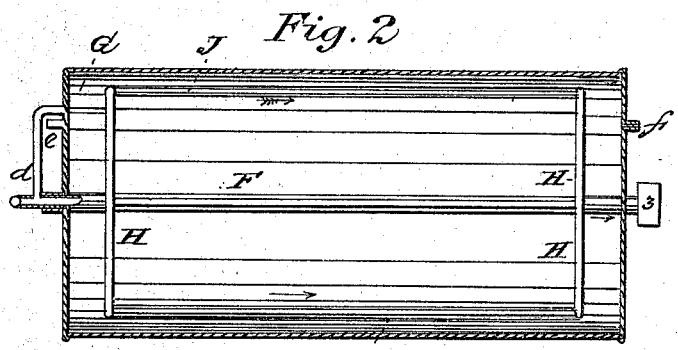
Witnesses:
Rufus N Rhodes
R Am R Rhodes
Inventor:
M S Bringier

United States Patent Office.

M. S. BRINGIER, OF ASCENSION PARISH, LOUISIANA.

Letters Patent No. 94,942, dated September 21, 1869.

---

IMPROVED APPARATUS FOR EVAPORATING CANE-JUICE.

---

The Schedule referred to in these Letters Patent and making part of the same.

---

*To all whom it may concern:*

Be it known that I, M. S. BRINGIER, of the parish of Ascension, State of Louisiana, have invented a certain new and useful and improved Mode of Evaporating Cane-Juice; and I do hereby declare the following to be a full, clear, and exact description of the same, reference being had to the annexed drawing, making a part of this specification.

My invention is designed to economize the manufacture of sugar, and at the same time to prevent injury from a destructive degree of heat in the process of reducing the cane juice to make it, by the combined application of the heat of the steam from the boiler of the sugar-mill, and from the evaporating-pans in which the reduction is effected.

The application of the heat of the steam that is generated in the boiler of the sugar-house to the purpose of evaporation in the manufacture of sugar is not a new idea, but hitherto no attempt has been made to utilize the heat of the vapor that is evolved from the juice itself in the process of its evaporation in a direct manner, which consequently has been wholly lost. My invention does this; and It consists of a novel arrangement of evaporating-pans or recipients of peculiar construction, that communicate with each other in such manner that the heat of the steam from the boiler, and from the pans themselves, is applied to each of the series, one after another, so economically that nearly all if not the whole of its effective power is absorbed and utilized by the time granulation has been effected.

But my invention will be better understood by reference to the drawing, whereon it is shown in the precise form in which I have demonstrated, by actual experiment, its capability of accomplishing the object specified.

On the drawing—

A represents a recipient or pan, through which, near its bottom, pass pipes *a*, which communicate in any proper manner with the steam-boiler.

These pipes may be of greater or less number, accordingly as a more extended or diminished heating-surface is required to produce the precise degree of evaporation that is desired, and at the opposite end of the pan to that at which they communicate with the boiler, they lead in a vacant recess thereat provided, or else curve upwardly, so as to re-enter the pan on a line which will be just above the upper surface of the cane-juice therein when the apparatus is in operation, so as to carry the steam and the heat into the vacant space between the said juice and the corrugated bottom of the second recipient or pan B, which is so constructed as to enter the pan A, and rest upon projecting ledges or supports some inches above the juice.

The pan B does not extend quite the whole length of A, so that there is an open space at one end of it, through which the combined steam or vapor from the boilers and the sirup in pans A, which intermingles below B, passes into a space above the latter into a third evaporator or pan, C, or rather into a narrow recess at end 1 of the latter, like that shown through the broken part at Figure 1, and which is formed by the end proper of said pan and a partition wall, D, as shown at end 2.

The object accomplished by the making of the bottom of B corrugated, is to extend the heating and absorbing-surface, in order to quicken the effec', but obviously this object might be obtained by a triangular, serpentine, and many other forms of bottom.

At a proper point a discharge-pipe or orifice, not shown on the drawing, provided with a stop-cock, is inserted in B, to draw off, at suitable intervals, the water which will be deposited therein by the condensation of a portion of the steam.

The pan C is so constructed as to fit snugly on the top of A, as shown.

As in the case of A, the pan C is permeated longitudinally with a number of pipes, *b*, through which the steam evolved from the boiler, the pan A, and the pan B, rushes into the recess at end 1, and thence through pipes *b*, so as to fill up the space at end 2 and over the upper surface of the juice, which is always maintained a little above the upper line of pipes *b*.

The pan C is also provided with a means for discharging the water that may accumulate in small quantities therein from condensation, as shown at *c*.

The open space at end 2 of pan C communicates, by means of a pipe, E, with a hollow shaft, F, which is fixed by any proper means in the centre of the cylindrical granulating-recipient or pan G.

The shaft F is provided with hollow arms H, to which are secured hollow circular paddles J, the aperture in the shaft F communicating with those in the arms H, and these latter with those in the paddles J, so as to extend the heating-surface that is brought to bear on the juice, now reduced to a granulating-condition that is contained in pan G. The arms H and pipe-formed paddles J may be multiplied indefinitely.

The steam escapes from shaft F through an opening at the end opposite to that at which it enters, which said end projects sufficiently beyond the end of the pan to afford room for a driving-pulley, 3, to be placed thereupon, to constitute a means for rotating the said shaft.

The temperature required to effect granulation is very much lower than what is required at every prior stage in the process of evaporation, but yet it must not fall below a certain point.

Inasmuch, therefore, as the paddles J may not be sufficient in themselves to keep up the proper degree of heat, a branch pipe, *d*, leads from the pipe E to the upper part of this recipient, so as to throw a current of steam in the same above the sirup, to act on the surface of the same.

A still further means of keeping up the requisite measure of heat consists of a volume of dry heated air that is brought, by means of a proper conduit-pipe, from the chimney of the sugar-mill or the furnace thereof, and thrown in recipient G at the opening $e$, which being somewhat larger than the aperture at $f$, at which said air escapes, causes the same to be concentrated or packed above the sirup.

Proper means for forcing this hot air into the pan G are applied to the pipe through which it is conducted, and, if found necessary, a fresh current of steam, direct from the boiler, may be thrown into pipe E, so as to increase the rapidity of its passage through the shaft F and its appendages.

I have not deemed it necessary to describe or show on the drawings any means for conveying the juice from one evaporating-recipient to another, which may consist of suitable pumps, or any equivalent thereof, because such means constitute no part of my invention, and any mechanic of ordinary skill will be able readily to adjust the same.

With very little care and attention, the heat of the steam, thrown from the boiler into the pan A, can always be kept below 240°, which is the maximum temperature which can with safety be applied in the evaporation of cane-juice. Hence it follows that my invention completely obviates all risk of injury to the sugar from the application of too much heat in the operation of making it, that so frequently occurs in the practice of existing methods of evaporation; and, furthermore, that insomuch as it employs the vaporization of the juice itself to a large extent, to continue and finish the evaporation, it is far the most economic method of conducting such process that has yet been discovered.

In the operation of my invention the juice is carried from pan to pan, beginning with C, and ending with granulator G, precisely as in the case of an ordinary system or set of evaporating-pans, which is too well known to require a description, and although designed especially for the evaporation of cane-juice, it is obvious that it may be as usefully and conveniently applied to the avaporation of many other liquids.

It should be placed as near as convenience will allow to the boiler or boilers from which the steam is supplied, and very firmly supported by suitable frame-work in all its parts.

Having thus described my invention,

I claim, and desire to secure by Letters Patent, is—

The mode of evaporation herein described, when the same is effected by the means and in the manner substantially as described, for the purpose set forth.

M. S. BRINGIER.

Witnesses:
R. N. RHODES,
RUFUS R. RHODES.